(12) United States Patent
Talukdar et al.

(10) Patent No.: US 10,924,511 B2
(45) Date of Patent: Feb. 16, 2021

(54) SYSTEMS AND METHODS OF CHUNKING DATA FOR SECURE DATA STORAGE ACROSS MULTIPLE CLOUD PROVIDERS

(71) Applicant: EMC IP Holding Company LLC, Hopkinton, MA (US)

(72) Inventors: Rohit Talukdar, Bangalore (IN); Krishna Mohan Gudipudi, Karnataka (IN); Sudeep Abraham Mathew, Karnataka (IN)

(73) Assignee: EMC IP Holding Company LLC, Hopkinton, MA (US)

(*) Notice: Subject to any disclaimer, the term of this patent is extended or adjusted under 35 U.S.C. 154(b) by 370 days.

(21) Appl. No.: 15/883,412

(22) Filed: Jan. 30, 2018

(65) Prior Publication Data

US 2019/0238590 A1   Aug. 1, 2019

(51) Int. Cl.
| | |
|---|---|
| *G06F 17/00* | (2019.01) |
| *H04L 29/06* | (2006.01) |
| *H04L 12/24* | (2006.01) |
| *H04L 29/08* | (2006.01) |
| *G06F 16/13* | (2019.01) |
| *G06F 16/182* | (2019.01) |
| *H04W 12/00* | (2021.01) |

(52) U.S. Cl.
CPC .............. *H04L 63/20* (2013.01); *G06F 16/13* (2019.01); *G06F 16/183* (2019.01); *H04L 41/0893* (2013.01); *H04L 63/126* (2013.01); *H04L 67/1097* (2013.01); *H04W 12/009* (2019.01)

(58) Field of Classification Search
CPC ... H04L 63/20; H04L 63/126; H04L 67/1097; H04L 41/0893; H04L 67/06; H04W 12/009; G06F 16/183; G06F 16/13; G06F 16/1824; G06F 3/0604; G06F 3/0631; G06F 3/0643; G06F 3/067
See application file for complete search history.

(56) References Cited

U.S. PATENT DOCUMENTS

| | | | |
|---|---|---|---|
| 8,087,087 B1 * | 12/2011 | van Oorschot | ....... H04L 63/102 726/25 |
| 9,367,557 B1 | 6/2016 | Lin et al. | |
| 9,411,815 B1 | 8/2016 | Lu et al. | |
| 9,514,146 B1 | 12/2016 | Wallace et al. | |
| 9,767,154 B1 | 9/2017 | Wallace et al. | |

(Continued)

*Primary Examiner* — Shewaye Gelagay
*Assistant Examiner* — Kevin Ayala
(74) *Attorney, Agent, or Firm* — BainwoodHuang

(57) ABSTRACT

Techniques for chunking data in data storage systems that provide increased data storage security across multiple cloud storage providers. The techniques employ a chunking engine and a policy engine, which evaluates one or more storage policies relating to, for example, cost, security, and/or network conditions in view of services and/or requirements of the multiple cloud storage providers. Having evaluated such storage policies, the policy engine generates and provides operating parameters to the chunking engine, which uses the operating parameters when chunking and/or distributing the data across the multiple cloud storage providers, thereby satisfying the respective storage policies. In this way, users of data storage systems obtain the benefits of cloud storage resources and/or services while reducing their data security concern and optimizing the total cost of data storage.

15 Claims, 4 Drawing Sheets

(56) References Cited

U.S. PATENT DOCUMENTS

| | | | |
|---|---|---|---|
| 2010/0332401 A1* | 12/2010 | Prahlad | G06F 3/0649 |
| | | | 705/80 |
| 2014/0040364 A1* | 2/2014 | Baldwin | H04L 45/24 |
| | | | 709/204 |
| 2014/0201541 A1* | 7/2014 | Paul | G06F 21/6245 |
| | | | 713/193 |
| 2015/0363611 A1* | 12/2015 | Redberg | G06F 21/602 |
| | | | 713/165 |
| 2016/0092312 A1* | 3/2016 | Dornquast | G06F 16/178 |
| | | | 707/692 |
| 2018/0373600 A1* | 12/2018 | Xu | G06F 11/1076 |
| 2019/0158593 A1* | 5/2019 | Sloane | H04L 63/0428 |

* cited by examiner

SYSTEMS AND METHODS OF CHUNKING DATA FOR SECURE DATA STORAGE ACROSS MULTIPLE CLOUD PROVIDERS

BACKGROUND

Conventional data storage systems generally include one or more storage processors coupled to one or more arrays of non-volatile storage devices such as, for example, magnetic disk drives, electronic flash drives, and/or optical drives. The storage processors are configured to service input/output (IO) requests, which are generated and provided by one or more host computers communicably coupled to the respective data storage systems. Such IO requests typically specify files and/or other data elements to be created on, read from, written to, and/or deleted from the arrays of non-volatile storage devices. The storage processors can service the IO requests by performing various data processing tasks to organize and arrange the files and/or other data elements for storage on the non-volatile storage devices. In typical data storage system configurations, the storage processors organize and arrange files in file systems, which are configured store data (and sometimes metadata) associated with the files in multiple data chunks. Such data chunks can correspond to data blocks, fragments of data blocks, or any other suitable units of data. Such data blocks typically have a fixed size (e.g., 8 kilobytes (kB)), and generally correspond to the smallest unit of storage space that the files systems are capable of allocating within the respective data storage systems.

SUMMARY

In recent years, data storage systems have increasingly employed remote cloud storage in place of, or in addition to, the storage provided by local arrays of non-volatile storage devices. The term "cloud storage" generally refers to online data storage resources and/or services such as, for example, database-like services, web-based storage services, network attached storage (NAS) services, and/or synchronization services. Cloud storage services are typically billed to end users on a utility computing basis, such as a specified monetary amount per gigabyte (GB) per month for storage services, and/or a specified monetary amount per GB for upload and/or download services. Such cloud storage services can provide benefits such as, for example, increased scalability and/or flexibility of storage capacity planning, as well as reduced storage management overhead by centralizing and outsourcing data storage administrative and infrastructure costs. However, while cloud storage resources/services have proven to provide benefits to users of data storage systems, their widespread acceptance has been hindered, at least in part, by data security concerns. Indeed, as providers of cloud storage resources have offered their services to an increasingly broad range of residential, business, and academic customers and end users, reliable data security has become a necessity to avoid disruptions and/or data security breaches.

Techniques are disclosed herein for chunking data in data storage systems that can provide increased data storage security across multiple cloud storage providers. The disclosed techniques employ a chunking engine and a policy engine, which can evaluate one or more storage policies relating to, for example, cost, security, and/or network conditions in view of services and/or requirements of the multiple cloud storage providers. Having evaluated such storage policies, the policy engine can generate and provide operating parameters to the chunking engine, which can use the operating parameters when chunking and/or distributing the data across the multiple cloud storage providers in order to conform to the respective storage policies. In this way, users of data storage systems can obtain the benefits of cloud storage resources and/or services while reducing their data security concerns.

In certain embodiments, a method of chunking data in a data storage system that provides increased data storage security across multiple cloud storage providers includes receiving, at the data storage system from a host computer, a file storage request pertaining to a file, in which the data storage system includes at least a policy engine and a chunking engine. The method further includes evaluating, by the policy engine, a storage policy of the data storage system to determine whether one or more cloud storage parameters of the multiple cloud storage providers conform to the storage policy, and, having determined that one or more cloud storage parameters conform to the storage policy, generating, by the policy engine, one or more operating parameters of the chunking engine for implementing the storage policy, in which one or more operating parameters specify at least one chunk size. The method still further includes partitioning, by the chunking engine, the file into a plurality of chunks having at least one chunk size, and transmitting the plurality of chunks having at least one chunk size for storage across the multiple cloud storage providers.

In certain arrangements, the method includes determining a fixed size of a chunk, and partitioning the file into the plurality of chunks, in which each of the plurality of chunks has the fixed size. In certain further arrangements, the method includes determining a variable size of a chunk, and partitioning the file into the plurality of chunks, in which at least some of the plurality of chunks have the variable size.

In still further arrangements, the method includes determining, by the policy engine, multiple levels of conformity of the respective cloud storage providers to the storage policy, in which the multiple levels of conformity include a first level of conformity and a second level of conformity. In such arrangements, the method further includes determining that a first cloud storage provider among the multiple cloud storage providers having the first level of conformity to the storage policy has one of a network failure, a server failure, and a breach in security, and transmitting at least some of the plurality of chunks originally destined for storage at the first cloud storage provider to a second cloud storage provider among the multiple cloud storage providers, in which the second cloud storage provider has the second level of conformity to the storage policy.

In certain further embodiments, a data storage system that chunks data in a manner providing increased data storage security across multiple cloud storage providers includes a memory storing a policy engine and a chunking engine, and storage processing circuitry. The storage processing circuitry is configured to execute the policy engine out of the memory to evaluate a storage policy of the data storage system to determine whether one or more cloud storage parameters of the multiple cloud storage providers conform to the storage policy, and, having determined that one or more cloud storage parameters conform to the storage policy, to generate one or more operating parameters of the chunking engine for implementing the storage policy, in which one or more operating parameters specify at least one chunk size. The storage processing circuitry is further configured to execute the chunking engine out of the memory to partition a file into a plurality of chunks having at least one chunk size. The data storage system then transmits the plurality of chunks having at least one chunk size for storage across the multiple cloud storage providers.

Other features, functions, and aspects of the invention will be evident from the Detailed Description that follows.

BRIEF DESCRIPTION OF THE DRAWINGS

The foregoing and other objects, features, and advantages will be apparent from the following description of particular embodiments of the invention, as illustrated in the accompanying drawings in which similar reference characters refer to the same parts throughout the different views.

DETAILED DESCRIPTION

Techniques are disclosed herein for chunking data in data storage systems that can provide increased data storage security across multiple cloud storage providers. The disclosed techniques employ a chunking engine and a policy engine, which can evaluate one or more storage policies relating to, for example, cost, security, and/or network conditions in view of services and/or requirements of the multiple cloud storage providers. Having evaluated such storage policies, the policy engine can generate and provide operating parameters to the chunking engine, which can use the operating parameters when chunking and/or distributing the data across the multiple cloud storage providers in order to conform to the respective storage policies. In this way, users of data storage systems can obtain the benefits of cloud storage resources and/or services while reducing their data security concern and optimizing the total cost of data storage.

Figure 1:
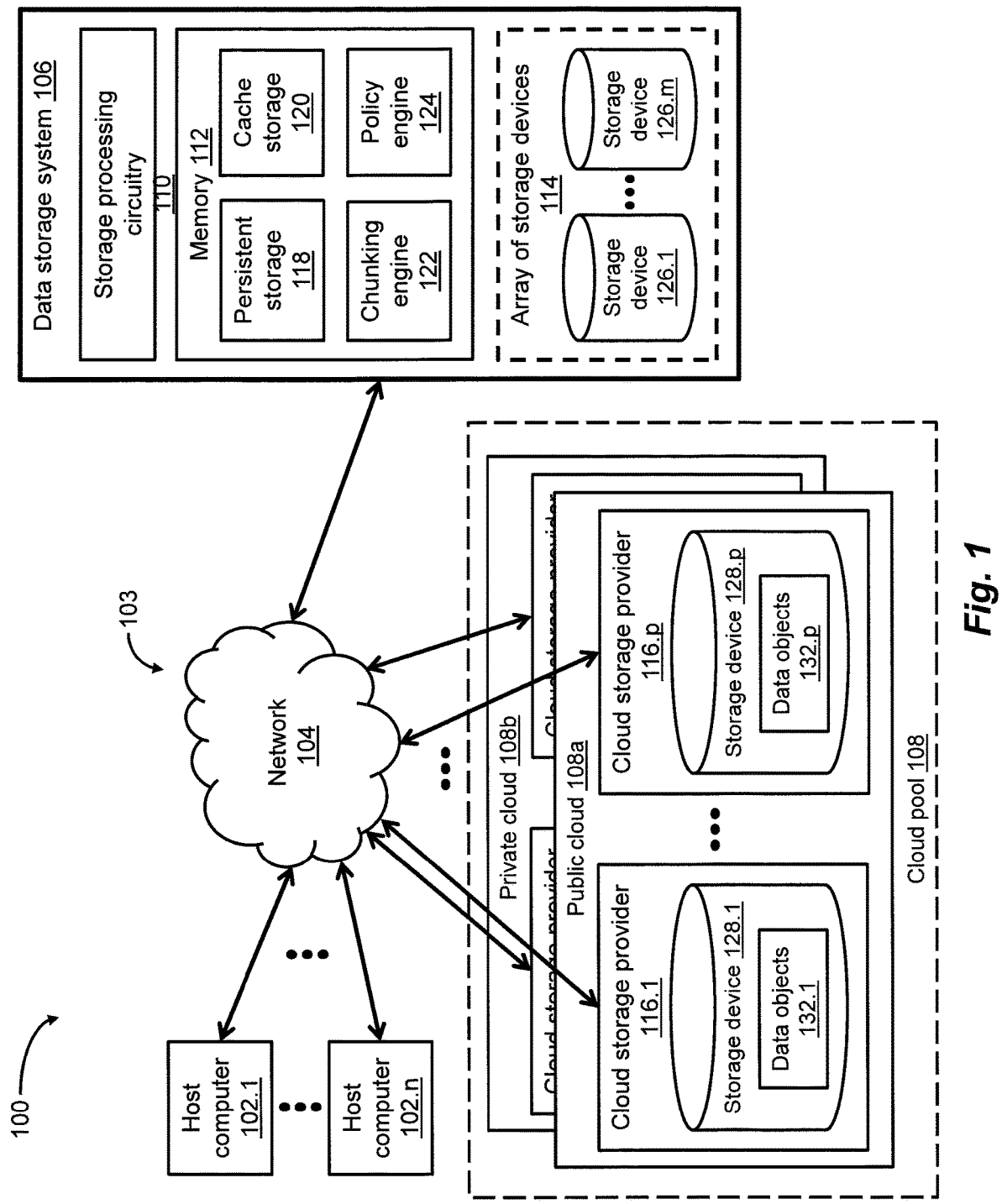
FIG. 1 is a block diagram of an exemplary environment in which an exemplary data storage system configured to chunk data in a manner that provides increased data storage security across multiple cloud storage providers can be employed.

FIG. 1 depicts an illustrative embodiment of an exemplary data storage system environment 100, in which an exemplary data storage system 106 configured to chunk data in a manner that provides increased data storage security across multiple cloud storage providers can be employed. As shown in FIG. 1, the data storage system environment 100 includes a plurality of host computers 102.1, . . . , 102.n communicably coupled to the data storage system 106 by a communications medium 103, which includes at least one network 104. For example, each of the plurality of host computers 102.1, . . . , 102.n may be configured as a web client/server computer, a file client/server computer, an email client/server computer, an enterprise client/server computer, and/or any other suitable client/server computer or computerized device for providing input/output (IO) requests to the data storage system 106 over the communications medium 103. The plurality of host computers 102.1, . . . , 102.n can generate and provide such IO requests to direct the data storage system 106 to store and/or retrieve files, blocks, or any other suitable unit of data to/from one or more storage devices (e.g., magnetic disk drives, electronic flash drives, optical drives).

The communications medium 103 can be configured to interconnect the plurality of host computers 102.1, . . . , 102.n and the data storage system 106 to enable them to communicate and exchange electronic signals and data. As shown in FIG. 1, at least a portion of the communications medium 103 is illustrated as a "cloud" to indicate that the communications medium 103 can have a variety of different topologies including, but not limited to, backbone, hub-and-spoke, loop, irregular, or any suitable combination thereof. The communications medium 103 can include, but is not limited to, copper based data communications devices and cabling, fiber optic devices and cabling, wireless devices, or any suitable combination thereof. In addition, the communications medium 103 can be configured to support SAN-based communications, local area network (LAN) based communications, cellular communications, wide area network (WAN) based communications, distributed infrastructure communications, and/or any other suitable network communications.

As shown in FIG. 1, the data storage system 106 can include storage processing circuitry 110, a memory 112, and an array of storage devices 114 including a plurality of storage devices 126.1, . . . , 126.m (e.g., magnetic disk drives, electronic flash drives, optical drives). The memory 112 can include persistent memory storage 118 (e.g., flash memory, magnetic memory) and non-persistent cache memory storage 120 (e.g., dynamic random access memory (DRAM), static random access memory (SRAM)), and accommodate a variety of software constructs including, but not limited to, a chunking engine 122, a policy engine 124, as well as operating system and data storage system code and data (not shown). The storage processing circuitry 110 can include one or more physical storage processors or engines, data movers, director boards, blades, IO modules, storage drive controllers, switches, and/or any other suitable computer hardware or combination thereof. For example, the storage processing circuitry 110 may process the IO requests provided by the plurality of host computers 102.1, 102.n, and store host data in a redundant array of independent disk (RAID) environment implemented by the array of storage devices 114. It is noted that the storage processing circuitry 110 can be implemented in a variety of ways, using one or more processors (or cores) running specialized software, one or more application specific integrated circuits (ASICs), one or more field programmable gate arrays (FPGAs), one or more discrete components, digital circuits, analog circuits, and so on, or any suitable combination thereof.

In the context of the storage processing circuitry 110 being implemented using one or more processors running specialized software, a computer program product can be configured to deliver all or a portion(s) of the specialized software to the storage processing circuitry 110. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an ASIC, an FPGA, and so on. The non-transient computer-readable storage media can be encoded with sets of instructions that, when executed by one or more of the processors, perform the methods described herein. Such media may be considered to be articles of manufacture, and may be transportable from one data storage system to another data storage system.

As further shown in FIG. 1, the data storage system environment 100 includes a pool of cloud resources and/or services 108 (also referred to herein as the "cloud pool"), which can include at least one public cloud 108a and at least one private cloud 108b. The term "cloud" generally refers to a portion of the Internet configured to allow online data storage and/or processing, as well as electronic access to software and/or other resources. The term "public cloud" generally refers to a portion of the cloud infrastructure that is available to the general public and operated by one or more third parties that sell cloud services, such as, for example, cloud storage services. Such third parties are referred to herein as "cloud storage providers." The term "private cloud" generally refers to another portion of the cloud infrastructure that is not available to the general public, but is operated for the benefit of one or more specific organizations. The infrastructure of a private cloud may be managed by a specific organization or other third party, and may be situated either on or off the organization or other third party's premises. Both the public cloud 108a and the private cloud 108b can include one or more cloud storage providers, such as cloud storage providers 116.1, . . . , 116.p included in the public cloud 108a. The infrastructures of the cloud storage providers 116.1, . . . , 116.p can include storage devices 128.1, . . . , 128.p (e.g., hard disk drives (HDDs), solid state drives (SSDs), tape drives, optical drives, network attached storage (NAS) devices, SAN devices), respectively, and each storage device 128.1, . . . , 128.p can be configured to store data objects 132.1, . . . , 132.p (e.g., a file, a portion of a file), respectively, as well as metadata. The communications medium 103 can also be configured to interconnect the data storage system 106 to the respective cloud storage providers included in the public cloud 108a and/or the private cloud 108b to enable them to communicate and exchange electronic signals and data.

Figure 2:
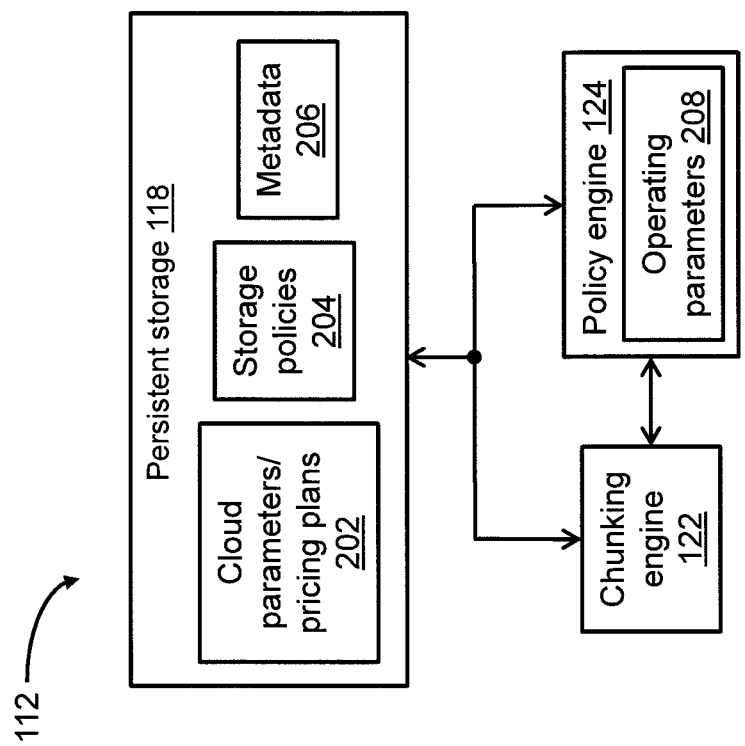
FIG. 2 is a block diagram of a chunking engine, a policy engine, and a persistent memory storage included in the data storage system of FIG. 1.

FIG. 2 depicts a view of the memory 112 within the data storage system 106, including the persistent memory storage 118, the chunking engine 122, and the policy engine 124. As shown in FIG. 2, the persistent memory storage 118 is configured to store cloud parameters and/or pricing plans 202, storage policies 204, and metadata 206. The cloud parameters/pricing plans 202 can pertain to the respective cloud storage providers included in the public cloud 108a and/or the private cloud 108b, such as the cloud storage providers 116.1, . . . , 116.p within the public cloud 108a. For example, such cloud parameters may include indications of (i) whether a respective cloud storage provider is within the public cloud 108a or the private cloud 108b, (ii) the level of redundancy provided by the respective cloud storage provider, (iii) the security features employed by the respective cloud storage provider (e.g., IP Security (SEC) protocol, Secure Sockets Layer (SSL) protocol, Transport Layer Security (TLS) protocol), and/or any other suitable cloud parameters. Further, such pricing plans can include information pertaining to (i) data storage costs, (ii) network charges, (iii) operations charges, (iv) data retrieval costs, (v) data deletion costs, and/or any other suitable pricing plan information. Such cloud parameters/pricing plans 202 can be provided for storage in the persistent memory storage 118 (and/or any other suitable storage) by (i) a user of the data storage system 106, (ii) the respective cloud storage providers 116.1, . . . , 116.p, (iii) the data storage system 106 itself by automatic data collection, and/or any other suitable technique.

The data storage system 106 is configured to identify storage locations for files and/or other data elements at the cloud storage providers of the public cloud 108a and/or the private cloud 108b (and sometimes on the array of storage devices 114), subject to one or more of the storage policies 204 stored in the persistent memory storage 118. Such storage policies 204 can each include one or more preferences and/or storage criteria for performing one or more storage operations. For example, a storage policy may specify that (i) a particular file, type of file, or portion of a file is to be stored at certain cloud storage providers of the public cloud 108a and/or the private cloud 108b, (ii) a particular file, type of file, or portion of a file is to be stored at certain cloud storage providers of the public cloud 108a and/or the private cloud 108b that can satisfy certain network bandwidth, network capacity, and/or other performance criteria, (iii) certain cloud storage providers of the public cloud 108a and/or the private cloud 108b are to be selected based on their proximity to the data storage system 106, and/or any other suitable specification(s) for data storage. Such storage policies 204 can further include at least one cost policy (e.g., a cost policy 304; see FIG. 3b) specifying a set of cost preferences and/or criteria for uploading data to, storing data on, and/or downloading data from the respective cloud storage providers of the public cloud 108a and/or the private cloud 108b. Once a particular file, type of file, or portion of a file is stored at certain cloud storage providers of the public cloud 108a and/or the private cloud 108b, information for subsequently locating and/or accessing the file or file portion is stored as part of the metadata 206 within the persistent memory storage 118.

During operation, the data storage system 106 (see FIG. 1) employs the chunking engine 122 and the policy engine 124 for chunking data in a manner that can provide increased data storage security across multiple cloud storage providers of the public cloud 108a and/or the private cloud 108b. To that end, the policy engine 124 can evaluate one or more of the storage policies 204 (see FIG. 2) relating to, for example, cost, security, and/or network conditions, in view of one or more services and/or requirements of the multiple cloud storage providers. Having evaluated such storage policies, the policy engine 124 can generate and provide operating parameters 208 (see FIG. 2) to the chunking engine 122, which uses the operating parameters 208 when chunking and/or distributing the data across the multiple cloud storage providers in order to conform to the respective storage policies 204. In this way, a user of the data storage system 106 can obtain benefits of the resources and/or services provided by the cloud storage providers, while substantially reducing his or her data security concern and optimizing the total cost of data storage.

The disclosed techniques of chunking data in data storage systems for providing increased data storage security across multiple cloud storage providers will be further understood with reference to the following illustrative example. In this example, it is assumed that the data storage system 106 (see FIG. 1) stores (i.e., writes) portions of a file across a subset of the cloud storage providers 116.1, . . . , 116.p included in the public cloud 108a, namely, the cloud storage provider 116.1, the cloud storage provider 116.2, and the cloud storage provider 116.3. For example, the data storage system 106 may operate to store the portions of the file in response to an IO request to write the file from one of the plurality of host computers 102.1, . . . , 102.n. It is noted that the data storage system 106 may alternatively store (i.e., write) such portions of a file across one or more cloud storage providers included in the public cloud 108*a* and/or the private cloud 108*b*.

Figure 3:
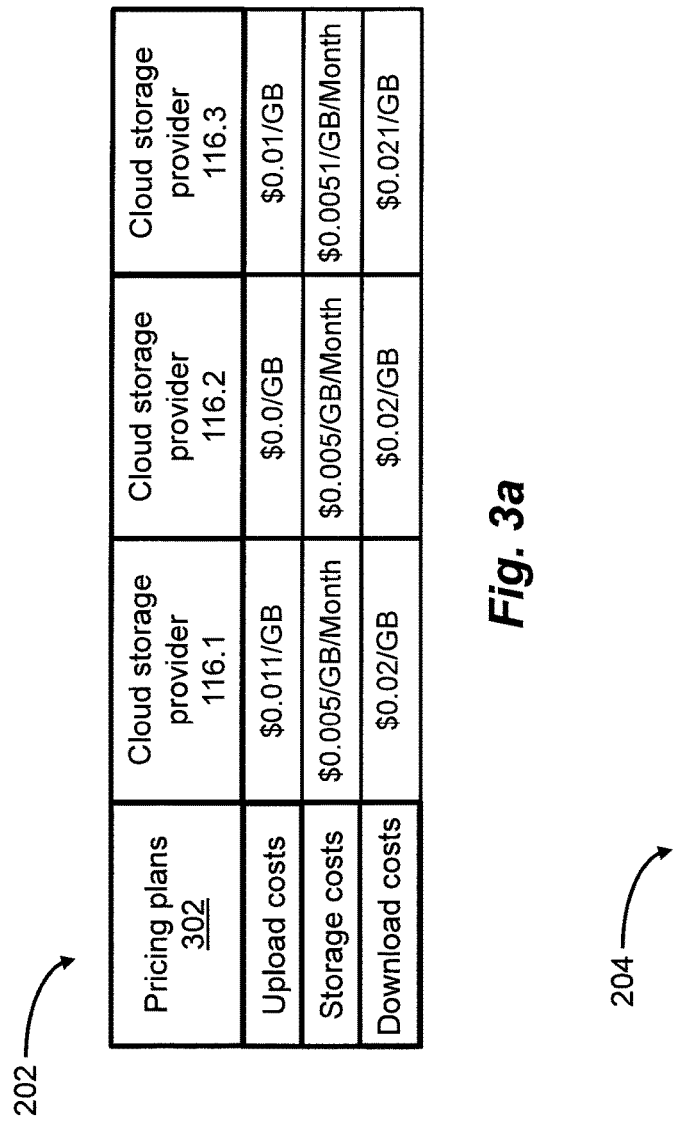
FIG. 3a is a diagram containing exemplary pricing plans for some of the multiple cloud storage providers of FIG. 1.
FIG. 3b is a diagram containing an exemplary cost policy for the data storage system of FIG. 1.

As described herein, the data storage system 106 is configured to store the cloud parameters/pricing plans 202 and the storage policies 204 within the persistent memory storage 118 (or any other suitable storage location). FIG. 3*a* depicts the pricing plans 202, namely, exemplary pricing plans 302, for the respective cloud storage providers 116.1, 116.2, 116.3 within the public cloud 108*a*. As shown in FIG. 3*a*, the pricing plans 302 include exemplary monetary amounts relating to upload costs, storage costs, and download costs for the respective cloud storage providers 116.1, 116.2, 116.3. Specifically, the pricing plan for the cloud storage provider 116.1 includes upload costs of $0.011 per gigabyte (GB), storage costs of $0.005/GB/month, and download costs of $0.02/GB. Further, the pricing plan for the cloud storage provider 116.2 includes upload costs of $0.0/GB, storage costs of $0.005/GB/month, and download costs of $0.02/GB; and, the pricing plan for the cloud storage provider 116.3 includes upload costs of $0.1/GB, storage costs of $0.0051/GB/month, and download costs of $0.021/GB. FIG. 3*b* depicts the storage policy 204, namely, an exemplary cost policy 304, for the data storage system 106. As shown in FIG. 3*b*, the cost policy 304 includes exemplary monetary amounts relating to an upload cost/GB limit (i.e., $0.011/GB), a maximum total storage cost (i.e., $2,500.00/year), a maximum total upload/download cost (i.e., $7,500.00/year), and a download cost/GB limit (i.e., $0.021/GB).

As described herein, the data storage system 106 receives the IO request from one of the plurality of host computers 102.1, . . . , 102.*n* to write the file (i.e., a sequence of data). Upon receipt of the IO request from the respective host computer 102.1, . . . , or 102.*n*, the policy engine 124 accesses the cost policy 304 (see FIG. 3*b*) stored as part of the storage policies 204 within the persistent memory storage 118, and further accesses the pricing plans 302 (see FIG. 3*a*) for the cloud storage providers 116.1, 116.2, 116.3 stored as part of the cloud parameters/pricing plans 202 within the persistent memory storage 118. As described herein, the data storage system 106 employs the chunking engine 122 and the policy engine 124 for chunking data in a manner that can provide increased data storage security across multiple cloud storage providers. To that end, the policy engine 124 evaluates the cost policy 304 in view of the pricing plan 302 for each of the cloud storage providers 116.1, 116.2, 116.3.

As shown in FIG. 3*a*, the pricing plans 302 for the cloud storage providers 116.1, 116.2, and 116.3 include the upload costs of $0.011/GB, $0.0/GB, and $0.01/GB, respectively. The pricing plans 302 for the cloud storage providers 116.1, 116.2, and 116.3 further include the download costs of $0.02/GB, $0.02/GB, and $0.021/GB, respectively. As shown in FIG. 3*b*, the cost policy 304 for the data storage system 106 includes the upload cost/GB limit of $0.011/GB and the download cost/GB limit of $0.021/GB. Accordingly, in its evaluation of the cost policy 304 in view of the pricing plans 302 for the respective cloud storage providers 116.1, 116.2, 116.3, the policy engine 124 determines that (i) the upload costs $0.011/GB, $0.0/GB, and $0.01/GB of the cloud storage providers 116.1, 116.2, and 116.3, respectively, are each within the upload cost/GB limit of $0.011/GB, and (ii) the download costs of $0.02/GB, $0.02/GB, and $0.021/GB of the cloud storage providers 116.1, 116.2, and 116.3, respectively, are each within the download cost/GB limit of $0.021/GB.

Having determined that the upload costs included in the pricing plans 302 for the cloud storage providers 116.1, 116.2, 116.3 are within the upload cost/GB limit of the cost policy 304 for the data storage system 106, and that the download costs included in the pricing plans 302 for the cloud storage providers 116.1, 116.2, 116.3 are within the download cost/GB limit of the cost policy 304 for the data storage system 106, the policy engine 124 operates in conjunction with the chunking engine 122 to implement the cost policy 304 across the cloud storage providers 116.1, 116.2, 116.3. It is noted that the policy engine 124 and the chunking engine 122 can implement the cost policy 304 across the respective cloud storage providers 116.1, 116.2, 116.3 over time, taking into account the maximum total storage cost of $2,500.00/year and the maximum total upload/download cost of $7,500.00/year, as specified in the cost policy 304. If the storage processing circuitry 110, executing instructions pertaining to the policy engine 124 and the chunking engine 122, determines over time that the maximum total storage cost and/or the maximum total upload/download cost specified in the cost policy 304 may be exceeded, then the policy engine 124 can re-evaluate the cost policy 304 in view of pricing plans for cloud storage providers (possibly) different from the cloud storage providers 116.1, 116.2, 116.3, and re-implement the cost policy 304 in conjunction with the chunking engine 122 across the (possibly) different cloud storage providers, as necessary in order to conform to the cost policy 304.

In order to implement the cost policy 304 across the cloud storage providers 116.1, 116.2, 116.3, the policy engine 124 generates the operating parameters 208 that the chunking engine 122 can use when chunking and/or distributing the data, i.e., the portions of the file, across the multiple cloud storage providers. Such portions of a file can be referred to as data chunks (or simply "chunks"). For example, the operating parameters 208 may include indications of a fixed chunk size or length, a variable chunk size(s) or length(s), a minimum chunk size or length, a maximum chunk size or length, a redundancy level for the file, and/or any other suitable operating parameter(s). Having received the operating parameters 208 from the policy engine 124, the chunking engine 122 uses the operating parameters 208 to partition the file, in accordance with a predetermined chunking algorithm (e.g., any suitable slice/dice/hashing algorithm), into multiple chunks that can be addressed at the bit level. For example, the chunking engine 112 may partition the file into multiple chunks based on chunk boundaries, which may be determined using file boundaries, directory boundaries, byte counts, etc. Because, in this example, the pricing plans 302 for the cloud storage providers 116.1, 116.2, 116.3 conform to the cost policy 305, the multiple chunks of the partitioned file can be transferred or otherwise transmitted from the data storage system 106 over the communications medium 103 for distribution and storage across the respective cloud storage providers 116.1, 116.2, 116.3 for increased data storage security.

In this example, the chunking engine 122 partitions the file into a representative eight (8) chunks, namely, chunk_0, chunk_1, chunk_2, chunk_3, chunk_4, chunk_5, chunk_6, and chunk_7, based on the operating parameters 208 generated by the policy engine 124. For example, the number of chunks into which the file is partitioned may be determined based on the fixed or variable chunk size(s) or length(s), the redundancy level for the file, etc., as specified in the operating parameters 208. Further, the storage processing circuitry 110, executing instructions pertaining to the chunking engine 122, operates to transfer or otherwise transmit the eight (8) chunks 0-7 over the communications medium 103 to the public cloud 108a, which includes the cloud storage providers 116.1, 116.2, 116.3. Having transmitted the eight (8) chunks 0-7 over the communications medium 103 to the public cloud 108a, the chunks 0-7 are distributed across the cloud storage providers 116.1, 116.2, 116.3, and stored as the data objects 132.1, 132.2, and 132.3 within the cloud storage providers 116.1, 116.2, and 116.3, respectively, as follows:

TABLE I

| Cloud storage provider 116.1 | Cloud storage provider 116.2 | Cloud storage provider 116.3 |
|---|---|---|
| Chunk_0 | Chunk_1 | Chunk_2 |
| Chunk_3 | Chunk_4 | Chunk_5 |
| Chunk_6 | Chunk_7 | |

Accordingly, as indicated in TABLE I above, the data objects 132.1 of the cloud storage provider 116.1 include chunk_0, chunk_3, and chunk_6, the data objects 132.2 of the cloud storage provider 116.2 include chunk_1, chunk_4, and chunk_7, and the data objects 132.3 of the cloud storage provider 116.3 include chunk_2 and chunk_5. It is noted, however, that the chunks 0-7 can be distributed across the respective cloud storage providers 116.1, 116.2, 116.3 for storage in any other suitable fashion, so long as such distribution and storage of the chunks 0-7 conform to the storage policies 204.

Once the chunks 0-7 are distributed across the cloud storage providers 116.1, 116.2, and 116.3 and stored as the data objects 132.1, 132.2, and 132.3, respectively, the storage processing circuitry 110, executing instructions pertaining to the chunking engine 122, further operates to generate the metadata 206 for subsequently locating and/or accessing the respective chunks 0-7. The metadata 206, stored in the persistent memory storage 118, includes enough information to provide access to the respective chunks 0-7 distributed across the cloud storage providers 116.1, 116.2, 116.3. In this example, the metadata 206 can include (i) identifiers (IDs) of the cloud storage providers 116.1, 116.2, 116.3, (ii) the fixed or variable size(s) of the respective chunks, (iii) an identifier (ID) of each chunk (the "chunk ID"), (iv) the location of each chunk across the respective cloud storage providers 116.1, 116.2, 116.3, (v) a signature of each chunk, (vi) the overall size of the file made up of the chunks 0-7, (vii) a checksum and/or other inode attributes of the file, (viii) reconstruction information for the file using the chunks 0-7, and/or any other suitable metadata information.

At a subsequent time, the data storage system 106 can retrieve the chunks 0-7 distributed across and stored at the cloud storage providers 116.1, 116.2, 116.3 in order to reconstruct the file made up of the respective chunks 0-7. For example, the data storage system 106 may operate to retrieve the chunks 0-7 and reconstruct the file in response to an IO request to read the file from one of the plurality of host computers 102.1, . . . , 102.n. Having received the IO request to read the file, the storage processing circuitry 110 accesses the metadata 206 stored in the persistent memory storage 118 to obtain the metadata information pertaining to locating and accessing the chunks 0-7, as well as reconstructing the file using the respective chunks 0-7. Once the metadata information is obtained, the storage processing circuitry 110 accesses the chunks 0-7 over the communications medium 103 at the locations of the cloud storage providers 116.1, 116.2, 116.3, and reconstructs the file using the chunks 0-7. The data storage system 106 then transmits the reconstructed file, over the communications medium 103, to the host computer 102.1, . . . , or 102.n that provided the IO request to read the file.

In this example, it was described that the size(s) or length(s) of the respective chunks 0-7 are included in the operating parameters 208 that the chunking engine 122 uses when chunking and/or distributing data across the multiple cloud storage providers, and that the operating parameters 208 (including the chunk size(s) and length(s)) are generated by the policy engine 124 in order to implement the cost policy 304 of the data storage system 106 across the cloud storage providers 116.1, 116.2, 116.3. It is noted that the size(s) or length(s) of the respective chunks 0-7 can remain unknown and undetermined within the data storage system 106 until after (i) the cost policy 304 (or any other storage policy(ies) 204) has been evaluated in view of the pricing plan 302 (or any other cloud parameter(s)/pricing plan(s) 202), and/or (ii) the operating parameters 208 have been generated to implement the cost policy 304. Further, such chunk size(s) or length(s), generated as part of the operating parameters 208, can be the same fixed size or length for each chunk of a file, or different variable sizes or lengths for chunks of the same file. For example, the operating parameters 208 may specify variable sizes or lengths for the chunks 0-7 (see TABLE I) based on certain rules and/or considerations pertaining to the partitioning of the file based on chunk boundaries. Further, such variable sizes or lengths for the chunks 0-7 may be specified based on the pricing plans 302 for the cloud storage providers 116.1, 116.2, 116.3, which may charge specified monetary amounts for upload and/or download services, for example, on a per-byte basis, a per-GB basis, based on the time of day when such upload and/or download services are requested, etc.

Figure 4:
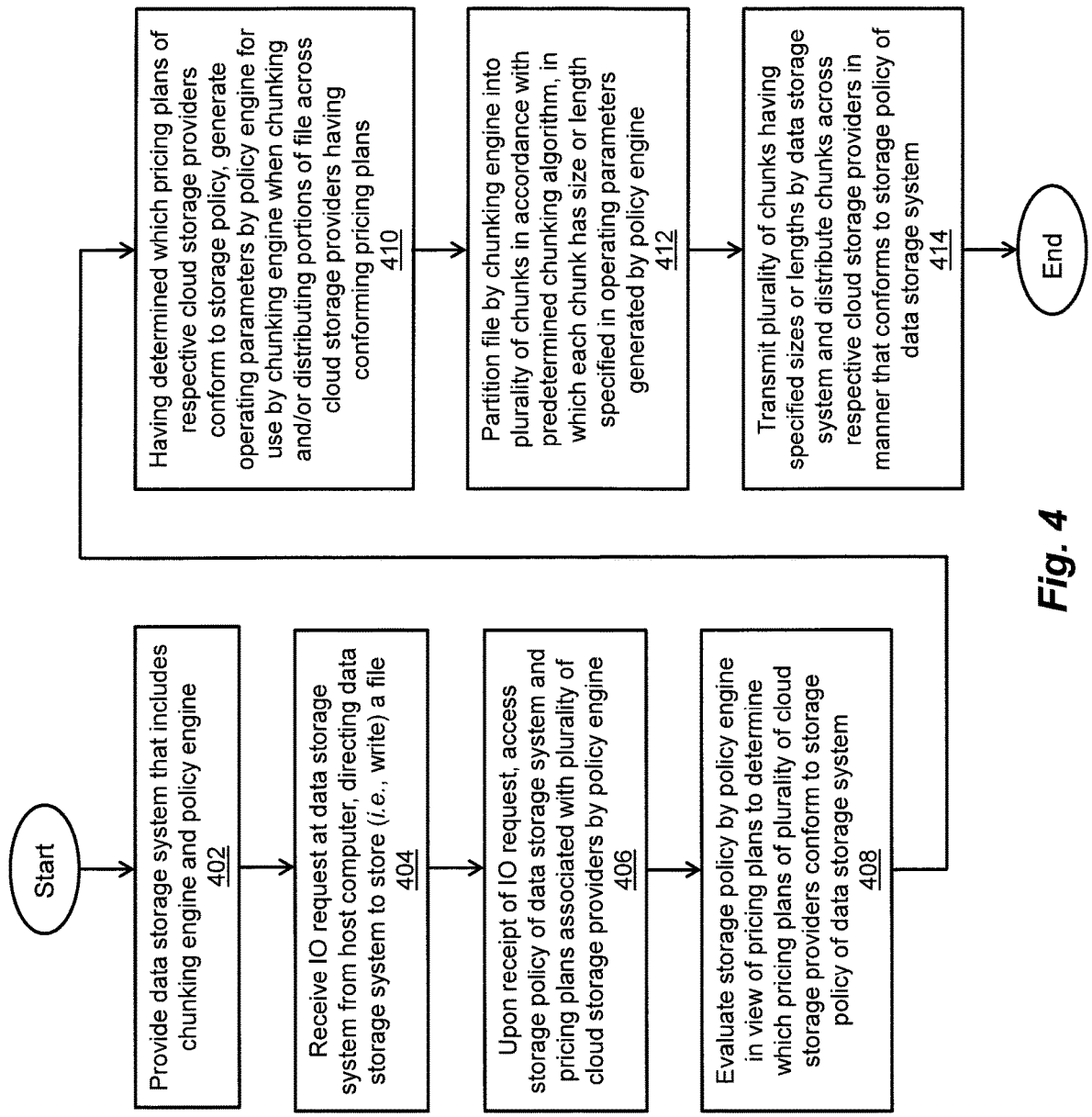
FIG. 4 is an exemplary method of chunking data in the data storage system of FIG. 1 that provides increased data storage security across multiple cloud storage providers.

An exemplary method of chunking data in a data storage system that provides increased data storage security across multiple cloud storage providers is described herein with reference to FIG. 4. As depicted in block 402, a data storage system is provided that includes a chunking engine and a policy engine. As depicted in block 404, an IO request is received at the data storage system from a host computer, directing the data storage system to store (i.e., write) a file. As depicted in block 406, upon receipt of the IO request, a storage policy of the data storage system and pricing plans associated with a plurality of cloud storage providers are accessed by the policy engine. As depicted in block 408, the storage policy is evaluated by the policy engine in view of the pricing plans to determine which pricing plans of the plurality of cloud storage providers conform to the storage policy of the data storage system. As depicted in block 410, having determined which pricing plans of the respective cloud storage providers conform to the storage policy, operating parameters are generated by the policy engine for use by the chunking engine when chunking and/or distributing portions of the file across the cloud storage providers having the conforming pricing plans. As depicted in block 412, the file is partitioned by the chunking engine into a plurality of chunks in accordance with a predetermined chunking algorithm, in which each chunk has a size or length specified in the operating parameters generated by the policy engine. As depicted in block 414, the plurality of chunks having the specified sizes or lengths are transmitted by the data storage system and distributed across the respective cloud storage providers in a manner that conforms to the storage policy of the data storage system.

Having described the foregoing techniques for chunking data in data storage systems that provide increased data storage security across multiple cloud storage providers, other alternative embodiments and/or variations can be made and/or practiced. For example, it was described herein that parameters included in the cloud parameters/pricing plans 202 (see FIG. 2) can have an indication of the level of redundancy provided by a respective cloud storage provider. In one or more alternative embodiments, the data storage system 106 can transfer or otherwise transmit multiple duplicate copies of one or more chunks of a file for storage on one or more cloud storage providers to obtain a desired level of redundancy and/or high availability. For example, the data storage system 106 may transmit duplicate copies of one or more chunks of a file to multiple cloud storage providers. Further, if one of the cloud storage providers experiences a network or server failure, then the data storage system 106 may retrieve the chunks of the file from another cloud storage provider that stores the duplicate copies.

It was further described herein that the policy engine 124 can generate and provide the operating parameters 208 to the chunking engine 122, which can use the operating parameters 208 when chunking and/or distributing data across multiple cloud storage providers in order to conform to the respective storage policies 204. In one or more alternative embodiments, the policy engine 124 can generate operating parameters that allow the data storage system 106 to distribute chunks of a file to multiple cloud storage providers with different levels of conformity to the storage policies 204. For example, if a cloud storage provider having the best conformity to the storage policies 204 experiences a network or server failure or a breach in security, then the data storage system 106 may transmit chunks of a file originally destined for storage at that cloud storage provider to another cloud storage provider having the next best conformity to the storage policies 204.

It was still further described herein that the size(s) or length(s) of respective chunks of a file can remain unknown and undetermined within the data storage system 106 until after the storage policies 204 have been evaluated and/or the operating parameters 208 have been generated to implement the storage policies 204. In one or more alternative embodiments, the size(s) or length(s) of respective chunks of the file can be selected by a user of the data storage system 106.

It was also described herein that the policy engine 124 can evaluate one or more of the storage policies 204 relating to cost, security, and/or network conditions in view of one or more services and/or requirements of the multiple cloud storage providers. In one or more alternative embodiments, the storage processing circuitry 110 can execute instructions pertaining to an encryption/decryption engine to encrypt chunks of a file before transmitting them for distribution and storage across multiple cloud storage providers, thereby providing increased data storage security. Further, upon retrieval of the encrypted chunks in response to an IO request, the storage processing circuitry 110 can further execute the instructions pertaining to the encryption/decryption engine to decrypt the chunks before reconstructing the file.

While various embodiments of the invention have been particularly shown and described, it will be understood by those skilled in the art that various changes in form and details may be made therein without departing from the scope of the invention, as defined by the appended claims.

What is claimed is:

1. A method of chunking data in a data storage system that provides increased data storage security across multiple cloud storage providers, comprising:

receiving, at the data storage system from a host computer, a file storage request pertaining to a file, the data storage system including at least a policy engine and a chunking engine;

evaluating, by the policy engine, a storage policy of the data storage system to determine whether one or more cloud storage parameters of the multiple cloud storage providers at least partially conform to the storage policy;

having determined that the one or more cloud storage parameters at least partially conform to the storage policy, determining, based on the one or more cloud storage parameters, multiple levels of conformity of the multiple cloud storage providers to the storage policy, the multiple levels of conformity including at least a best level of conformity to the storage policy and a next best level of conformity to the storage policy;

generating, by the policy engine, one or more operating parameters of the chunking engine for implementing the storage policy at the multiple cloud storage providers, the one or more operating parameters specifying at least one chunk size;

partitioning, by the chunking engine, the file into a plurality of chunks having the at least one chunk size;

transmitting the plurality of chunks having the at least one chunk size for storage across the respective multiple cloud storage providers having the best level of conformity to the storage policy;

determining that a first cloud storage provider from among the multiple cloud storage providers having the best level of conformity to the storage policy has one or more of a network failure, a server failure, and a breach in security; and transmitting at least some of the plurality of chunks originally destined for storage at the first cloud storage provider to a second cloud storage provider from among the multiple cloud storage providers having the next best level of conformity to the storage policy.

2. The method of claim 1 wherein the generating of the one or more operating parameters of the chunking engine includes determining a fixed size of a chunk, and wherein the partitioning of the file includes partitioning the file into the plurality of chunks, each of the plurality of chunks having the fixed size.

3. The method of claim 1 wherein the generating of the one or more operating parameters of the chunking engine includes determining a variable size of a chunk, and wherein the partitioning of the file includes partitioning the file into the plurality of chunks, at least some of the plurality of chunks having the variable size.

4. The method of claim 1 further comprising:

having transmitted the plurality of chunks for storage across the multiple cloud storage providers, generating metadata information for locating and accessing the plurality of chunks, the metadata information including at least some of (i) identifiers (IDs) of the multiple cloud storage providers, (ii) the at least one chunk size of the plurality of chunks, (iii) an identifier (ID) of each respective chunk, (iv) a location of each chunk across the multiple cloud storage providers, (v) a signature of each chunk, (vi) an overall size of the file made up of the plurality of chunks, (vii) a checksum of the file, and (viii) reconstruction information for the file using the plurality of chunks.

5. The method of claim 4 further comprising:

retrieving, by the data storage system, the plurality of chunks from across the multiple cloud storage providers using at least some of the metadata information pertaining to the plurality of chunks.

6. The method of claim 5 further comprising:
having retrieved the plurality of chunks from across the multiple cloud storage providers, reconstructing the file using at least some of the metadata information pertaining to the file.

7. The method of claim 1 wherein the evaluating of the storage policy of the data storage system includes determining that portions of the file are to be stored at one or more of the multiple cloud storage providers that satisfy one or more of a predetermined network bandwidth and a predetermined network capacity.

8. A data storage system that chunks data in a manner providing increased data storage security across multiple cloud storage providers, comprising:
a memory storing a policy engine and a chunking engine; and
storage processing circuitry,
wherein the storage processing circuitry is configured to execute the policy engine:
to evaluate a storage policy of the data storage system to
determine whether one or more cloud storage parameters of the multiple cloud storage providers at least partially conform to the storage policy;
having determined that the one or more cloud storage parameters at least partially conform to the storage policy, to determine, based on the one or more cloud storage parameters, multiple levels of conformity of the multiple cloud storage providers to the storage policy, the multiple levels of conformity including at least a best level of conformity to the storage policy and a next best level of conformity to the storage policy;
to generate one or more operating parameters of the chunking engine for implementing the storage policy at the multiple cloud storage providers, the one or more operating parameters specifying at least one chunk size,
wherein the storage processing circuitry is further configured to execute the chunking engine to partition a file into a plurality of chunks having the at least one chunk size, and
wherein the data storage system is configured to transmit the plurality of chunks having the at least one chunk size for storage across the multiple cloud storage providers having the best level of conformity to the storage policy; and
to determine that a first cloud storage provider from among the multiple cloud storage providers having the best level of conformity to the storage policy has one or more of a network failure, a server failure, and a breach in security,
wherein the data storage system is further configured to transmit at least some of the plurality of chunks originally destined for storage at the first cloud storage provider to a second cloud storage provider from among the multiple cloud storage providers having the next best level of conformity to the storage policy.

9. The data storage system of claim 8 wherein the storage processing circuitry is further configured to execute the policy engine to determine a fixed size of a chunk, and wherein the storage processing circuitry is further configured to execute the chunking engine to partition the file into the plurality of chunks, each of the plurality of chunks having the fixed size.

10. The data storage system of claim 8 wherein the storage processing circuitry is further configured to execute the policy engine to determine a variable size of a chunk, and wherein the storage processing circuitry is further configured to execute the chunking engine to partition the file into the plurality of chunks, at least some of the plurality of chunks having the variable size.

11. The data storage system of claim 8 wherein the storage processing circuitry is further configured to execute the chunking engine, once the plurality of chunks are transmitted for storage across the multiple cloud storage providers, to generate metadata information for locating and accessing the plurality of chunks, the metadata information including at least some of (i) identifiers (IDs) of the multiple cloud storage providers, (ii) the at least one chunk size of the plurality of chunks, (iii) an identifier (ID) of each respective chunk, (iv) a location of each chunk across the multiple cloud storage providers, (v) a signature of each chunk, (vi) an overall size of the file made up of the plurality of chunks, (vii) a checksum of the file, and (viii) reconstruction information for the file using the plurality of chunks.

12. The data storage system of claim 11 wherein the data storage system is further configured to retrieve the plurality of chunks from across the multiple cloud storage providers using at least some of the metadata information pertaining to the plurality of chunks.

13. The data storage system of claim 12 wherein the data storage system is further configured, having retrieved the plurality of chunks from across the multiple cloud storage providers, to reconstruct the file using at least some of the metadata information pertaining to the file.

14. A computer program product having a non-transitory computer readable medium that stores a set of instructions that, when carried out by computerized circuitry, cause the computerized circuitry to perform a method of chunking data in a data storage system that provides increased data storage security across multiple cloud storage providers, the method comprising:
receiving, at the data storage system from a host computer, a file storage request pertaining to a file, the data storage system including at least a policy engine and a chunking engine;
evaluating, by the policy engine, a storage policy of the data storage system to determine whether one or more cloud storage parameters of the multiple cloud storage providers at least partially conform to the storage policy;
having determined that the one or more cloud storage parameters at least partially conform to the storage policy, determining, based on the one or more cloud storage parameters, multiple levels of conformity of the multiple cloud storage providers to the storage policy, the multiple levels of conformity including at least a best level of conformity to the storage policy and a next best level of conformity to the storage policy;
generating, by the policy engine, one or more operating parameters of the chunking engine for implementing the storage policy at the multiple cloud storage providers, the one or more operating parameters specifying at least one chunk size;
partitioning, by the chunking engine, the file into a plurality of chunks having the at least one chunk size;

transmitting the plurality of chunks having the at least one chunk size for storage across the multiple cloud storage providers having the best level of conformity to the storage policy;

determining that a first cloud storage provider from among the multiple cloud storage providers having the best level of conformity to the storage policy has one or more of a network failure, a server failure, and a breach in security; and transmitting at least some of the plurality of chunks originally destined for storage at the first cloud storage provider to a second cloud storage provider from among the multiple cloud storage providers having the next best level of conformity to the storage policy.

15. The computer program product of claim 14 wherein the generating of the one or more operating parameters of the chunking engine includes determining a variable size of a chunk, and wherein the partitioning of the file includes partitioning the file into the plurality of chunks, at least some of the plurality of chunks having the variable size.

* * * * *